Dec. 27, 1960  A. CERVINKA  2,966,230
STORAGE AND DEAERATION OF VISCOUS LIQUID MATERIAL
Filed Sept. 15, 1958
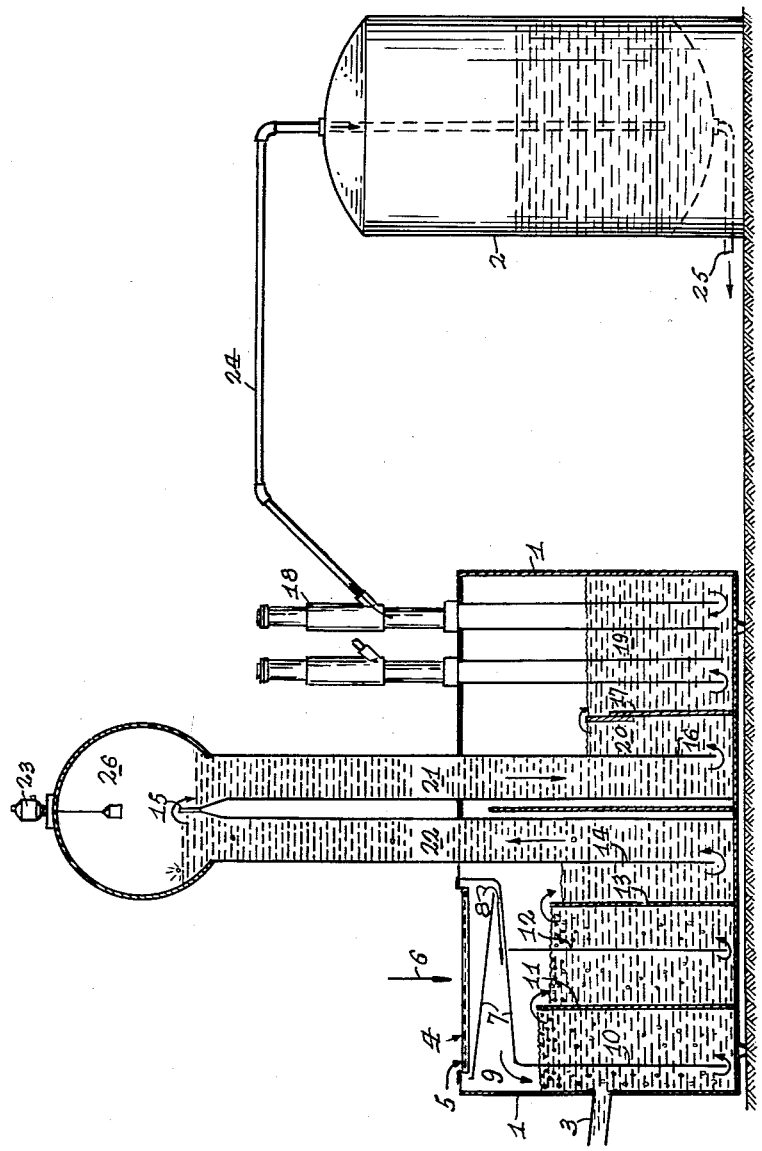
Inventor
A. Cervinka
By Glascox K Downing Seebold
Attys.

United States Patent Office 2,966,230
Patented Dec. 27, 1960

2,966,230
STORAGE AND DEAERATION OF VISCOUS LIQUID MATERIAL

Anthony Cervinka, Batawa, Ontario, Canada, assignor to Bata Shoe Company of Canada Limited, Ontario, Canada Filed Sept. 15, 1958, Ser. No. 761,088

Claims priority, application Canada Jan. 17, 1958

2 Claims. (Cl. 183—2.5)

This invention relates to the storage and deaeration of viscous liquid material.

In the moulding of articles, air bubbles are usually undesirable in the liquid moulding material. This is especially true in slush moulding processes, where thin-walled articles are being moulded and the presence of air bubbles in the liquid moulding material will tend to weaken or destroy the usefulness of the finished product. For example, in the manufacture of footwear by slush moulding, small air pockets in the uppers or soles will greatly weaken the finished boot or shoe.

To overcome this problem it has been proposed in the past to use high vacuum force to eliminate such bubbles. The present invention relates to a new and simpler method of disposing of unwanted air bubbles in liquids, using a system of baffles, together with a relatively low vacuum force.

The attached drawing illustrates one embodiment of an apparatus suitable for use with the invention.

Referring now in detail to the drawing, a storage tank 1 and a pressure filling tank 2 are illustrated together with a supply tank feed-pipe 3 leading to the storage tank 1 from a mixing vat (not shown). The supply of moulding liquid is fed through the supply pipe 3 into the storage tank 1, and the supply fed into the storage tank 1 can be controlled by any known means.

A draining area is shown near the upper limit of the storage tank 1, and this is provided with a screen closure 5. This draining area 4 is designed for use with slush moulding processes, and is positioned to receive the moulding liquid as the moulds are emptied of moulding material following initial heating and gelling of a skin within the mould. The liquid material being emptied over the draining area flows in the direction of the arrow 6 through the screen 5 and over the baffle tables 7, respectively, in the direction of arrows 8 and 9. The liquid material is then fed under and over a series of vertical baffles. In the drawing light baffles are shown, and are numbered 10 to 17. As the moulding liquid fills the compartment on the outside of baffle 10, the baffle opening at the bottom of baffle 10 permits the liquid in the compartments on each side of baffle 10 to attain a common level.

As the level of the liquid in the first two compartments reaches the level of baffle 11 the liquid will flow over baffle 11 and fill the compartments on each side of baffle 12. Similarly, as the quantity of liquid in the storage tanks increases, the compartments on each side of baffle 13 will become filled.

As the liquid flows through the baffle compartments, gravitational force causes the air bubbles entrapped in the liquid to the surface. As the liquid flows over the top of baffles 11 and 13 the bubbles are liberated from the moulding liquid. The bubbles thus liberated will remain on the surface of the liquid in the compartments behind baffles 13 and 11, and will not continue with the flow of liquid beyond baffle 13.

Turning now to the pressure filling tank 2, it will be seen that this tank is filled from the storage tank 1 by means of a pump 18. The pump 18 sucks the liquid from compartment 19, tending to create a vacuum above the liquid level. The vacuum created in the upper part of compartment 19 causes the level of the liquid in compartment 20 to rise, and the level of the liquid in column 21 to fall, thus creating a low vacuum in column 21. Due to the low vacuum in column 21, atmospheric pressure on the compartments on either side of baffle 15 will cause the liquid to rise in column 22, and eventually to flow over baffle 15. As the liquid flows over the baffle 15 the pressure in the air bubbles will be greater than that of the surrounding medium, liberating the bubbles from the liquid. A permanent low vacuum will remain in vacuum bell 26.

It may be useful to supplement the vacuum-causing action of the pump 18 with an auxiliary vacuum pump 23 on vacuum bell 26.

Thus, a continuous supply of deaerated moulding liquid can be kept available in the pressure filling tank 2, being fed to through pipe 24 from pump 18 to pressure filling tank 22 as required. Leading from the pressure filling tank 2 is a pipe 25, connecting with a mould filling station (not shown). As mentioned above, the level of the liquid in the storage tank 1 can be controlled by any known means which will actuate the entry of an additional supply of liquid through the supply tank feed pipe 3, as the supply becomes depleted through use.

While one preferred embodiment is herein described, the spirit and scope of the invention should be limited only by the appended claims.

I claim:

1. An apparatus for the storage and deaeration of viscous liquid material comprising end, side, top and bottom walls defining a storage tank, means for introducing liquid material into said tank through one of said side walls, a screened inlet in the top wall adjacent one of said end walls for admitting further liquid into the storage tank, at least one baffle table within the tank below said inlet inclined downwardly from adjacent said one end wall in the direction of the opposite end wall, at least a second baffle table below said first-mentioned baffle table inclined downwardly in the direction of and terminating short of said one end wall to provide a circuitous path for the further liquid, a plurality of spaced apart vertical baffles extending longitudinally of the tank for a substantial length of the tank with at least the vertical baffle adjacent said one end wall being connected to said second baffle table to provide a compartment between such vertical baffle and said one end wall and said succeeding baffles defining therebetween a series of compartments, means providing liquid communication between said succeeding compartments, at least two of said vertical baffles between the screen inlet and the other end wall being extended above the top wall of the tank to constitute an elevated compartment, a vacuum bell positioned on top of said elevated compartment, means dividing said elevated compartment into two vertical columns, a pressure filling tank, pump means within said storage tank between said opposite end wall and the last vertical baffle communicating with said pressure filling tank whereby when said pump means aspirates liquid from the space between said opposite end wall and said last-named vertical baffle there is created a vacuum above the liquid level thereby causing the liquid level of the column in said elevated compartment closest to said pump means to fall and cause the liquid level in the other of said columns to rise and ultimately flow over the vertical baffle separating such columns thus liberating bubbles from the liquid.

2. An apparatus as claimed in claim 1, further including an auxiliary vacuum pump operably connected with said vacuum bell.

References Cited in the file of this patent

UNITED STATES PATENTS

| | | |
|---|---|---|
| 1,518,785 | Gibson | Dec. 9, 1924 |
| 1,529,884 | Hall | Mar. 17, 1925 |

FOREIGN PATENTS

| | | |
|---|---|---|
| 638,198 | Great Britain | May 31, 1950 |